Nov. 27, 1934.  P. B. TAYLOR  1,982,331

FIELD STRENGTH METER

Filed Sept. 30, 1932

WITNESSES:
C. J. Weller.
Fred C. Wilham

INVENTOR
Paul B. Taylor.
BY F. W. Lyle.
ATTORNEY

Patented Nov. 27, 1934

1,982,331

UNITED STATES PATENT OFFICE 1,982,331

FIELD STRENGTH METER

Paul B. Taylor, Chicopee Falls, Mass., assignor to Westinghouse Electric & Manufacturing Company, East Pittsburgh, Pa., a corporation of Pennsylvania Application September 30, 1932, Serial No. 635,547

15 Claims. (Cl. 250—20)

My invention relates to electrical measuring instruments and in particular to instruments for measuring the strength of the electromagnetic field set up by a radio broadcasting station.

The principal object of my invention is to provide an instrument of the type referred to in the preceding paragraph of such a type that fortuitous variations from time to time and from place to place in its electrical characteristics such as internal capacity, self inductance, resistance and leakance can be detected in the routine course of operation of the instrument and errors in observation due to such variations will be avoided.

Another object of my invention is to provide an instrument of said type which makes correction for the series resistance and distributed self capacity of a loop antenna, which is normally a part of said instrument.

Briefly stated, the instrument constituting my invention comprises a tuned loop antenna in which alternating voltages are set up by any periodic electromagnetic field at a point where the antenna is set up in position, a high impedance radio frequency voltmeter, preferably of the push-pull vacuum tube type, and calibrating means incorporated in the instrument for determining the ratio between the voltage output of the antenna and the field strength.

In arrangements such as that just described, the electromotive force induced in the loop antenna is an accurate measure of the strength of the electromagnetic field under observation; and the objective is to produce a reading of an instrument in the plate circuit of the three electrode tubes of the vacuum tube voltmeter which shall be an accurate measure of this electromotive force. However, the reading of such an instrument is, in general, a function, not only of this electromotive force but also of the electrostatic capacity, self-inductance, resistance and leakance of the antenna and certain circuits connecting the antenna with the vacuum tube voltmeter. The four electrical characteristic quantities mentioned in the preceding sentence are, in general, liable to vary from time to time with temperature, humidity, position of the apparatus and the like, and it is necessary to find means of eliminating them as factors in the measurement of the loop antenna electromotive force. The way in which this is accomplished in accordance with my invention will become apparent upon reading the following description taken in connection with the accompanying drawing, in which:

Figure 1:
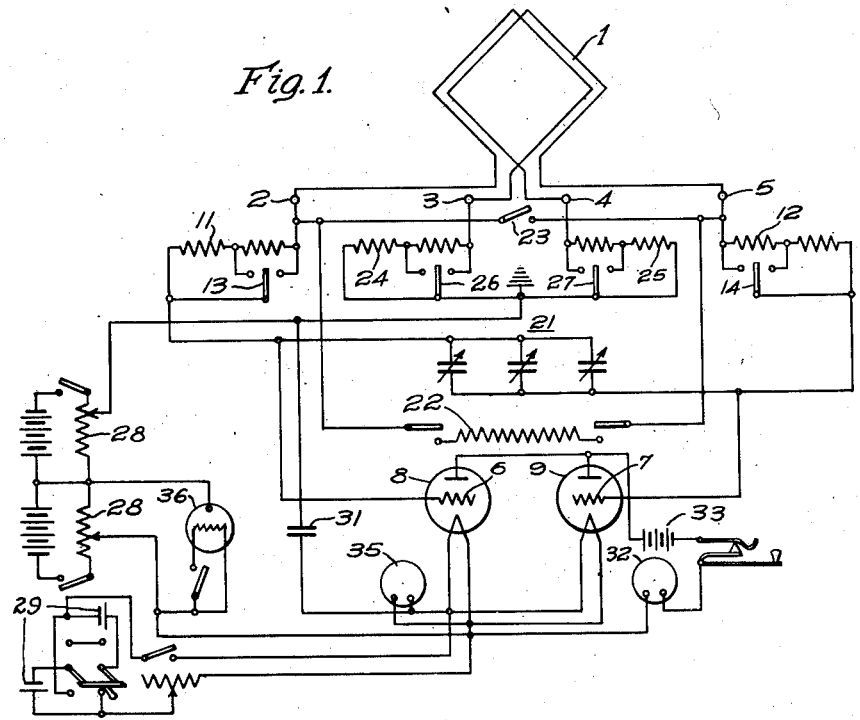
Figure 1 shows a circuit diagram of an apparatus embodying my invention.

Referring specifically to Fig. 1, the reference numeral 1 indicates a loop antenna which may be of any suitable well known type except that it is open circuited at its mid point. The four resulting terminals of this antenna are numbered 2, 3, 4 and 5. The end terminals 2 and 5 are connected to the grid electrodes 6, 7 of a pair of three electrode tubes 8, 9 which may be of the well-known hot-cathode high-vacuum type. Interposed serially in the connections 2, 6 and 5, 7 just described are substantially non-inductive resistors 11, 12 provided, respectively, with switches 13, 14 by which they may be short circuited in whole or in part, as indicated. A variable condenser 21 is bridged across from the common terminal of elements 11, 8 to the common terminal of elements 12, 7. A variable resistor 22 is arranged so that it may be connected from terminal 2 to terminal 5 of antenna 1 when so desired. Antenna 1 is provided with a short circuiting switch 23 to be closed when making the full setting of the vacuum tube voltmeter.

The antenna terminals 3 and 4 are connected to each other through two substantially non-inductive resistors 24, 25 each provided with a switch 26, 27 by which the said resistors may be wholly or partly short circuited at will. The common terminal of the resistors 24, 25, which may be grounded, is connected to a variable potentiometer 28 by means of which any desired bias voltage may be impressed upon the grid electrodes 6, 7. The filaments of tubes 8, 9 are connected in multiple to a battery 29 and to the potentiometer 28, the latter being bridged by a by-pass condenser 31. The cathode filaments of tubes 8, 9 are connected to the plate electrodes thereof through a direct-current indicating instrument 32 and a B battery 33. A voltmeter 35 may conveniently be provided to accurately adjust the filament voltage of tubes 8 and 9 and a second voltmeter 36 to ensure accurate adjustment of the potentiometer 28.

To make a reading of the strength of the electromagnetic field, the above-described instrument it set up with its loop antenna positioned at the point where the field strength is to be measured and variable condenser 21 adjusted to form with loop antenna 1 a resonant circuit, such resonance being indicated by adjusting condenser 21 until instrument 32 reads a maximum. Four distinct readings of the voltage input to the vacuum tube voltmeter are taken. The first is taken with resistors 11, 12, 24, 25, all short circuited by their respective switches 13, 14, 26, 27; and with resistor 22 disconnected from the circuit. Call this reading V.

A second reading is taken with the resistance 22 added to the foregoing circuit by closing the switches shown at its terminals. Call this reading $V_g$.

A third reading is taken with the resistors 11, 12 added to the circuit for the first reading by opening their respective switches 13, 14. Call this reading $V_r$.

A fourth reading is then taken with the resistors 24, 25 added to the circuit of the first reading by opening their respective switches 26, 27. Call this reading $V_{r1}$.

Figure 2:
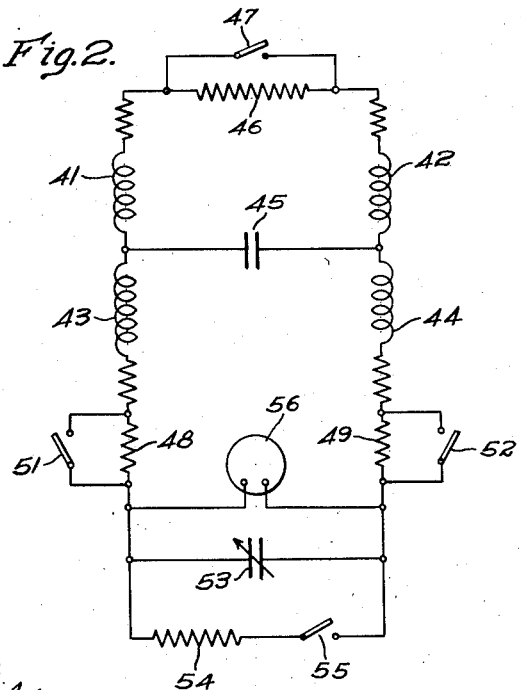
Fig. 2 is a schematic diagram illustrating the electrical properties of the arrangement of Fig. 1 and used in the following explanation of the operation thereof.

Fig. 2 is a diagrammatic representation in a form well known to electrical engineers of the simplified circuit of Fig. 1. The network comprising impedances 41, 42, 43, 44, each comprising an inductance and a resistance, cross-connected at their mid point by the condenser 45 is the equivalent T-network of the loop antenna 1, it being recognized in accordance with electrical engineering theory that the distributed inductance and capacity of the loop 1 may be represented exactly or approximately by the inductance and capacity of such a network. The resistance 46 with a short circuiting switch 47 is the simplified equivalent of the resistances 24, 25 and their short circuited switching switches 26, 27 of Fig. 1. The resistances 48, 49 with their short circuiting switches 51, 52 are the simplified equivalents of the resistances 11, 12 and their short circuiting switches 13, 14. The condenser 53 is the simplified equivalent of variable condenser 21 in Fig. 1 and the resistor 54 and switch 55 are the simplified equivalent of resistor 22 of Fig. 1. The circle 56 of Fig. 2 is a simplified representation of the three electrode tubes 8, 9 the instrument 32 and the potentiometer 28 and batteries 29 and 33 which together constitute the vacuum tube voltmeter of Fig. 1.

Considering the alternating electromotive force E to be induced by the electromagnetic field under observation equally in the four inductances 41, 42, 43, 44 and applying the ordinary equations for alternating current circuits to the network of Fig. 2 the value V, of the voltage set up at the terminals of the indicating device 56 by the electromotive force E when switches 47, 51, 52 are closed and switch 55 is open, can be calculated. It will be seen that this calculation corresponds to the conditions of the first reading mentioned above in connection with Fig. 1. Similarly, the value $V_g$ of the voltage at the terminals of instrument 56 can be calculated for a condition in which the switch 55 is closed, switches 47, 51 and 52 being likewise closed as in the preceding calculation. It will be seen that this calculation corresponds to the second reading described in connection with Fig. 1. Similarly a third calculation may be made for a circuit in which switches 51, 52 and 55 are open and switch 47 closed. It will be seen that this is a calculation $V_r$ corresponding to the third reading described in connection with Fig. 1. A fourth calculation may then be made of a circuit in which switches 47 and 55 are open, and switches 51 and 52 closed. This calculation is of $V_{r1}$ corresponding to the fourth reading described in connection with Fig. 1.

Since in making the readings above described, the variable condenser 21 is adjusted so that in connection with the loop antenna it forms a resonant circuit, it will be recognized that, in accordance with well known electrical laws $$p^2LC=1,$$

L being the effective self-inductance of the loop antenna, C being the capacity of condenser 21, and $p$ being the angular velocity of the alternating current i. e. being $2\pi$ times the radio frequency. In general, circuit design will be such that $pL$ will be very much larger than the resistance of the loop and the series resistances employed in the apparatus, and similarly $pC$ will be very much larger than the leakance between grids and filaments of the voltmeter and the leakance resistance 22.

The calculations of V, $V_g$, $V_r$, $V_{r1}$ give four equations involving the four unknown quantities, the series resistance of the loop, the distributed capacity of the loop, the capacity across the output terminals of the loop, the leakage across the output terminals of the loop, together with the known increments, namely, R the combined resistance of resistors 48 and 49, $R_1$ the resistance of resistor 46, G the conductance of the resistor 22. These four equations may be employed by a well known algebraic process to eliminate these four unknown quantities. Carrying out this elimination gives the following results:—

$$E = \frac{2\overline{V}}{\sqrt{\frac{1}{G}\left(\frac{V}{V_g}-1\right)\left[\sqrt{\frac{1}{R}\left(\frac{V}{V_r}-1\right)} - \sqrt{\frac{1}{R_1}\left(\frac{V}{V_{r1}}-1\right)}\right]}}$$

The value of the electromotive force E, induced in the loop is thus obtained in terms of the readings V, $V_g$, $V_r$, $V_{r1}$ described in connection with Fig. 1, together with the readily measured values G, R, and $R_1$ of the resistors 22, 11—12 and 24—25.

To calibrate the instrument 32 in terms of strength of the electromagnetic field, a reading, or preferably a series of readings, may be made with the loop 1 positioned close to a standard oscillator of such type that its radiated electromagnetic field may be accurately calculated. Alternatively this may be done by any of the other methods which are well known in the art. For example, the antenna and calibrating means may be removed and a known resistor carrying known alternating currents connected across the input terminals of the voltmeter. Once such a calibration is made, the instrument may be used in any location and variations in the values of resistance, capacitance or leakance of the loop and its connections will not enter into measurements obtained by the system of readings described in connection with Fig. 1.

It will thus be seen that I have provided an arrangement which is both simple and easy to operate, by which accurate measurements of an electromagnetic field may be made at any desired point, and which will be free from errors due to uncontrolled variation in the electrical constants of the measuring circuit.

While I have described in the foregoing one specific embodiment of my invention, it will be recognized by those skilled in the art that this is only illustrative of the broad principles involved, and that many other embodiments of these same principles may be made which are intended to be within the scope of my invention and of the following claims.

I claim as my invention:

1. In combination with a loop antenna a hot cathode tube with a source of direct current voltage and an indicating instrument connected between the cathode and plate electrodes thereof and means for connecting said antenna to impress a voltage between the cathode and grid of said tube, and means for inserting a known resistance in series in said loop antenna so as to be traversed by the resonance current thereof.

2. In combination with a loop antenna a hot cathode tube with a source of direct current voltage and an indicating instrument connected between the cathode and plate electrodes thereof and means for connecting said antenna to impress a voltage between the cathode and grid of said tube, a capacitance adapted to be connected to form a tuned circuit with said antenna and means for inserting a known resistance in series in said tuned circuit.

3. In combination with a loop antenna a hot cathode tube with a source of direct current voltage and an indicating instrument connected between the cathode and plate electrodes thereof and means for connecting said antenna to impress a voltage between the cathode and grid of said tube, a variable condenser connected in shunt to said antenna and means for inserting a known resistance in series between said loop antenna and said condenser.

4. In combination with a loop antenna a hot cathode tube with a source of direct current voltage and an indicating instrument connected between the cathode and plate electrodes thereof and means for connecting said antenna to impress a voltage between the cathode and grid of said tube, means for inserting at will a known resistance in series with said loop antenna, a known resistance and means for connecting it at will in shunt to said antenna.

5. In combination with a loop antenna a hot cathode tube with a source of direct current voltage and an indicating instrument connected between the cathode and plate electrodes thereof and means for connecting said antenna to impress a voltage between the cathode and grid of said tube, means for inserting a resistor at will in series with said antenna at the mid-point thereof and means for inserting at will a resistor in series with said antenna at each end thereof.

6. In combination with a loop antenna a hot cathode tube with a source of direct current voltage and an indicating instrument connected between the cathode and plate electrodes thereof and means for connecting said antenna to impress a voltage between the cathode and grid of said tube, means for inserting a resistor at will in series with said antenna at the mid-point thereof and means for inserting at will a resistor in series with said antenna at each end thereof and a variable condenser adapted to be connected in shunt to said antenna.

7. In combination with a loop antenna a hot cathode tube with a source of direct current voltage and an indicating instrument connected between the cathode and plate electrodes thereof and means for connecting said antenna to impress a voltage between the cathode and grid of said tube, means for inserting a resistor at will in series with said antenna at the mid-point thereof and means for inserting at will a resistor in series with said antenna at each end thereof and a variable condenser adapted to be connected in shunt to said antenna and means for connecting at will a resistor in shunt to said antenna.

8. In combination with a loop antenna, a pair of hot cathode tubes in shunt connection as regards their main electrodes through a source of direct current voltage and an indicating instrument, means for connecting the opposite ends of said antenna to the respective control electrodes of said tubes and for connecting the mid-point of said antenna through a voltage bias to the cathodes of said tubes, a variable condenser connected in shunt to said loop antenna and means for inserting at will resistors in series between said grid electrodes and said antenna.

9. In combination with a loop antenna, a pair of hot cathode tubes in shunt connection as regards their main electrodes through a source of direct current voltage and an indicating instrument, means for connecting the opposite ends of said antenna to the respective control electrodes of said tubes and for connecting the mid-point of said antenna through a voltage bias to the cathodes of said tubes, a variable condenser connected in shunt to said loop antenna and means for inserting at will resistors in series between said grid electrodes and said antenna and means for inserting at will resistors between the two halves of said antenna and said biasing means.

10. In combination with a loop antenna, a pair of hot cathode tubes in shunt connection as regards their main electrodes through a source of direct current voltage and an indicating instrument, means for connecting the opposite ends of said antenna to the respective control electrodes of said tubes and for connecting the mid-point of said antenna through a voltage bias to the cathodes of said tubes, a variable condenser connected in shunt to said loop antenna and means for inserting at will resistors in series between said grid electrodes and said antenna and means for connecting at will a resistor in shunt to said antenna.

11. In combination with a loop antenna an alternating current voltmeter and means for connecting said antenna to impress a voltage across the input terminals of said voltmeter, means for inserting at will a known resistance in series with said antenna, a resistor and means for connecting it at will in shunt to said antenna.

12. In combination with a loop antenna, an alternating current voltmeter and means for connecting said antenna to impress a voltage across the input terminals of the said voltmeter, means for inserting at will a resistor in series with said antenna at the mid-point thereof and means for inserting at will a resistor in series with said antenna at each end thereof and a variable condenser adapted to be connected in shunt to said antenna and means for connecting at will a resistor in shunt to said antenna.

13. In combination with a loop antenna, an alternating current voltmeter with input terminals balanced to ground, means for connecting the opposite terminals of said antenna to the input terminals of said voltmeter, a variable condenser connected in shunt to said loop antenna and means for inserting at will resistors in series between said input terminals and said antenna.

14. In combination with a loop antenna balanced to ground, an alternating current voltmeter with input terminals balanced to ground, means for connecting the opposite ends of said antenna to the input terminals of said voltmeter, a variable condenser connected in shunt to said loop antenna and means for inserting at will resistors in series between said input terminals of said voltmeter and said antenna and means for inserting at will resistors between the two halves of said antenna and ground.

15. In combination with a loop antenna balanced to ground, an alternating current voltmeter with input terminals balanced to ground, means for connecting opposite ends of said antenna to the input terminals of said voltmeter, a variable condenser connected in shunt to said loop antenna and means for inserting at will resistors in series between said terminals and said antenna and means for connecting at will a resistor in shunt to said antenna.

PAUL B. TAYLOR.